(12) United States Patent
Allemann et al.

(10) Patent No.: US 7,110,988 B1
(45) Date of Patent: Sep. 19, 2006

(54) AUTOMATED SYSTEM AND METHOD FOR CREATING ALIGNED GOALS

(75) Inventors: Andrew W. Allemann, Austin, TX (US); Shad W. Reynolds, Austin, TX (US); Adam R. Hunter, Austin, TX (US); Justin B. Petro, Austin, TX (US)

(73) Assignee: Trilogy Development Group, Inc., Austin, TX (US)

( * ) Notice: Subject to any disclaimer, the term of this patent is extended or adjusted under 35 U.S.C. 154(b) by 585 days.

(21) Appl. No.: 09/920,458

(22) Filed: Aug. 1, 2001

(51) Int. Cl.
 *G06F 15/18* (2006.01)
 *G06G 7/00* (2006.01)

(52) U.S. Cl. ............... 706/7; 706/3; 706/4; 700/50; 701/40; 701/57; 701/98

(58) Field of Classification Search ............... 705/8, 705/7; 706/7; 273/400; 473/471, 478
 See application file for complete search history.

(56) References Cited

U.S. PATENT DOCUMENTS

| | | | | |
|---|---|---|---|---|
| 5,548,506 | A * | 8/1996 | Srinivasan ............... | 705/8 |
| 5,819,263 | A * | 10/1998 | Bromley et al. ........... | 707/3 |
| 6,330,572 | B1 * | 12/2001 | Sitka ..................... | 707/205 |
| 2002/0035500 | A1 * | 3/2002 | Yoko et al. ............... | 705/9 |
| 2002/0173999 | A1 * | 11/2002 | Griffor et al. ............. | 705/7 |
| 2002/0194046 | A1 * | 12/2002 | Sullivan et al. ........... | 705/8 |
| 2003/0229529 | A1 * | 12/2003 | Mui et al. ................. | 705/8 |
| 2004/0172320 | A1 * | 9/2004 | Spellman et al. ......... | 705/8 |

OTHER PUBLICATIONS

Lowry et al; Organisational characteristics, cultural qualities and excellence in leading Australian-owned information technology firms; Information Systems Conference of New Zealand Proceedings; Oct. 30-31, 1996; pp. 72-84.*

Boardman et al; Integrated process improvement in design and manufacture using a systems approach; IEE Proceedings-Control Theory and Applications; vol. 143, Is. 2; Mar. 1996; pp. 171-185.*

Jurison; Software project management: the manager's view; Communications of the AIS: Nov. 1999.*

Begeman et al; Session I—supporting face-to-face groups: Project Nick: meetings augmentation and analysis; Proceedings of the 1986 ACM conference on Computer-supported cooperative work; Dec. 1986.*

Payne et al; Demonstration: persuasive agents and architectures: Agent-based support for human/agent teams; CHI '00 extended abstracts on Human factors in computing systems; Apr. 2000.*

(Continued)

*Primary Examiner*—Anthony Knight
*Assistant Examiner*—Ronald E. Williams, Jr.

(57) ABSTRACT

A method of aligning a new goal of an entity ensures that the new goal is a child goal of a parent goal. The method also ensures that a group is linked to the parent goal, and ensures that the entity is subordinate to the group. In one embodiment, selection lists constrain the available values for the group and/or the parent goal. In another aspect, a method of facilitating contextual alignment of a new goal recognizes an organizational role for an entity and customizes content of a user interface, based on the organizational role of the entity. The user interface with the customized content provides goal creation guidance according to the organizational role. In one embodiment, the customized content includes specialized instructions and sample content for characteristics of the new goal, such as a goal-objective characteristic, a goal-measure characteristic, and a goal-activity characteristic.

38 Claims, 14 Drawing Sheets

OTHER PUBLICATIONS

Chmura et al; Tools to align goals and information systems; IEEE Software; vol. 12, Is. 3; May 1995; pp. 108-109.*

Oinas; Defining goal-driven fault management metrics in a real world environment: a case-study from Nokia; Proceedings of the Fourth European Software Maintenance and Reengineering; Feb. 29-Mar. 3, 2000; pp. 101-107.*

Lassenius et al; The interactive goal panel: a methodology for aligning R&D activities with corporate strategy; International Conference on Engineering and Technology Management Proceedings; Oct. 11-13, 1998; pp. 142-147.*

Electronic Brochure entitled "A Quantitative Leadership Tool for Performance Management" obtained from "Performance eWorkbench" (TM) hyperlink on webpage at <http://www.performaworks.com/performaworks/solution/products.html>, Printed Feb. 6, 2001.

Webpage for Performaworks-Performaworks Solution-Products at <http://www.performaworks.com/performaworks/solution/products.html>, Printed Feb. 6, 2001.

* cited by examiner

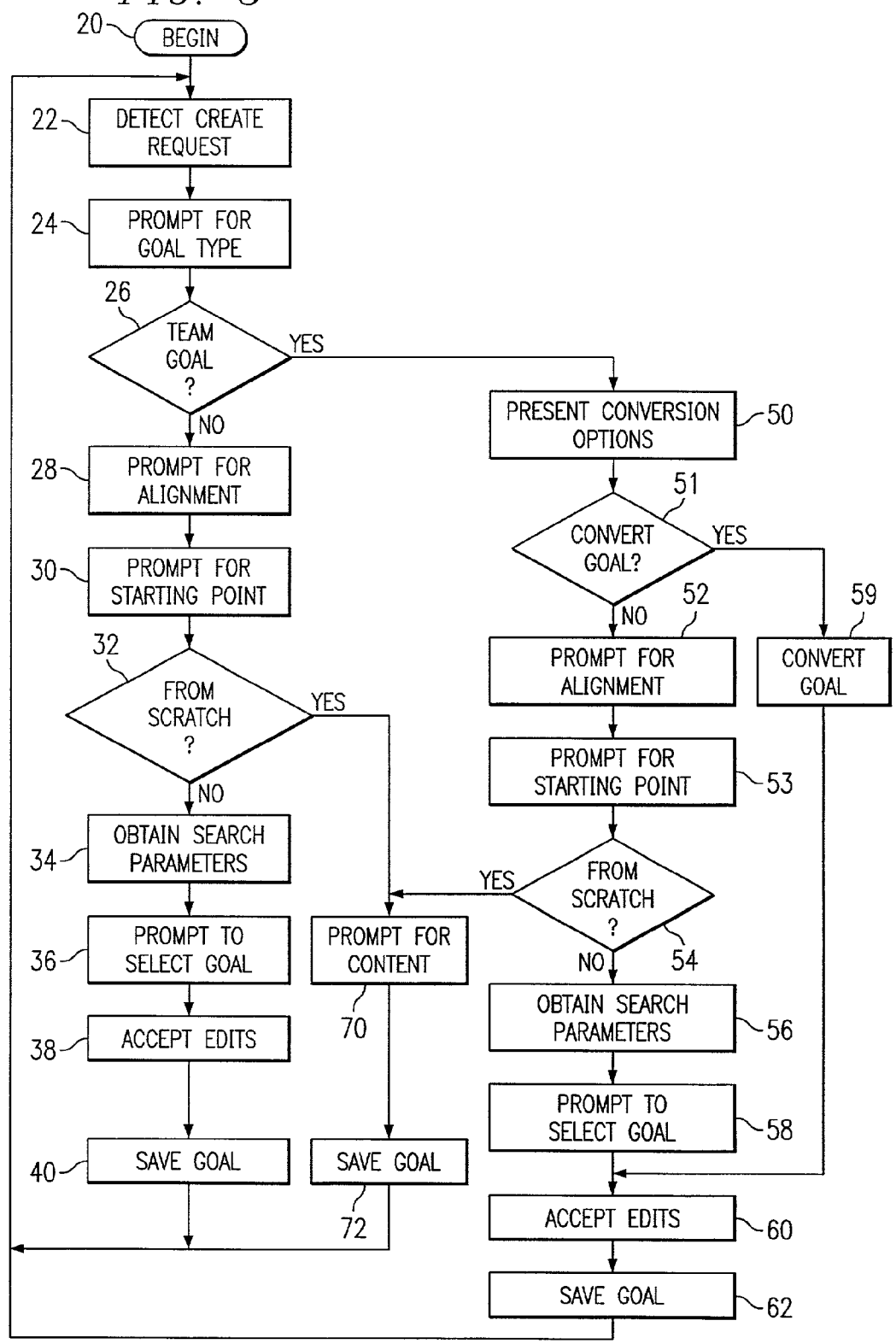

Leadership.com

Goals@Company Wednesday, November 21

Home  Your Account  Administration  Help  Logout

Modules Quick Jump ▼

Goals
- Your Summary
- Your Goals
- Discuss Your Goals
- Edit Your Goals
- > Create a New Goal
- Get Help

Search [↑]

| Goals | People | Teams | Archive | Help |

<<Home
Create a New Goal Wizard

| Goals | Discuss | Edit | Create |

Progress ▭▭▭▭

Step 4 – Use your profile to search for goals

Name: Joe Smith          Job Title: Manager          Type of Goal: Take the Hills ▼

Business Unit: Consulting    Verticle: Automotive       Ranks: All ▼

Manager: Johnny Bu — 120

Goals will search on your profile and give you goals that match your criteria and alignment.

[Begin Search]

Results                                                                              Page 1 of 1

Goal Objectives:                                                    Rank:   Goal Owner:
◉ Move the Average bill rate to $260.  — 122                         1      John Smith
◉ Move both average to 260, as well as save a gross profit           1      Sammy Jenkis
   of x percentage of the quarly lag n.
◉ Always make myself available to be involved in recruiting          1      Jill Wright
   events. make sure I'm up to date and well versed
   in trilogy's business and values.

[Continue to step 5] — 124 eFeedback                                                              Trilogy   Legal

Leadership.com

Goals@Company Wednesday, November 21

Home  Your Account  Administration  Help  Logout

Modules Quick Jump ▼

Goals
- Your Summary
- Your Goals
- Discuss Your Goals
- Edit Your Goals
- > Create a New Goal
- Get Help Search eFeedback

| Goals | People | Teams | Archive | Help |

<<Home
Create a Team Goal

| Goals | Discuss | Edit | Create |

Progress ▋▋▋▋▋

Step 2 – New or Existing Goal

Make one of your goals a Team Goal  ~148

⦿ Move the Average bill rate to $260.

○ Move both average to 260, as well as save a gross profit of x percentage of the quarly lag n.

○ Always make myself available to be involved in recruiting events. make sure I'm up to date and well versed in trilogy's business and values.

You can select one of your own goals for your team. The goal will remain yours, but it will also allows your team to align to it.

[ Continue to step 3 ]  ~150

---

Create a New Goal from Scratch

If you are creating a brand new goal, proceed here. Any goal you make for your team will automatically appear as your goal as well.

[ Continue to step 3 ]  ~152

Trilogy  Legal

*FIG. 14*

AUTOMATED SYSTEM AND METHOD FOR CREATING ALIGNED GOALS

CROSS REFERENCE TO RELATED APPLICATIONS

This application is related to U.S. patent application Ser. No. 09/895,458, entitled AUTOMATED SYSTEM AND METHOD FOR MANAGING GOALS, filed on Jun. 29, 2001, (hereinafter, the 0109 Application). The 0109 Application is hereby incorporated herein by reference.

TECHNICAL FIELD OF THE INVENTION

This invention relates in general to the field of data processing. More specifically, this invention relates to an automated system and method for creating aligned goals.

BACKGROUND OF THE INVENTION

A typical large business organization includes numerous teams of people, with one or more specific tasks assigned to each of the teams. A traditional business tends to define its teams in terms of the business' chain of command (i.e. the reporting chain). For example, a typical business sales division has a number of sales teams, each led by a manager who reports to a vice president of sales. In this type of chain-of-command structure, members of a sales team are "direct reports" of their manager. Other members of the organization typically must coordinate activities with a sales team member through that member's reporting structure. An entity such as a business organization thus typically includes numerous subsidiary entities such as teams and individuals, and some of those entities are subordinate to others, according to the command chain or according to other relationship rules.

Companies generally identify certain strategic and tactical goals, which they believe will lead the company to success. Specifically, managers typically establish goals for their reporting units, and employees are also often encouraged to set personal goals.

Recently, business leaders have come to recognize a number of advantages associated with adopting more flexible strategies for organizing teams and setting goals to supplement the rigid, hierarchical reporting structures traditionally found in large organizations. For example, rather than requiring all team members to have the same supervisor, a more flexible strategy allows at least some teams to include members from different levels of a reporting chain and/or from different reporting chains. Teams with members from different reporting chains are considered cross-functional teams. For instance, a sales manager may be assigned to a product development team charged with creating a salable product. Such a cross-functional team increases the likelihood that a developed product will be commercially viable.

Similarly, another flexible strategy for organizing teams and setting goals allows team leaders to set team goals but does not require strict adherence to a conventional reporting chain when choosing team leaders. By adopting flexible and dynamic strategies for managing teams and goals, organizations facilitate more rapid and effective adaptation to changes in the business environment, provided that those strategies are well implemented.

A disadvantage associated with flexible and dynamic strategies for organizing teams and goals, however, is that such strategies typically result in team and goal structures with increased complexity, compared to traditional chain-of-command strategies for managing teams and goals. For example, effective personal goals align with team goals and organization-wide goals. In a flexible and dynamic environment, however, organization-wide, team, and personal goals are rarely static, as company objectives, products, personnel responsibilities, and personnel team memberships may frequently change in response to changing conditions in a realistic business environment.

Flexible and dynamic strategies for managing teams and goals are therefore typically much more difficult to implement. Although conventional management information systems (MISs) may provide basic functionality for storing static goals, conventional MISs generally lack facilities for overcoming the difficulties associated with flexible and dynamic strategies for managing teams and goals.

SUMMARY OF THE INVENTION

The present invention relates to a method, a program product, and a system for guiding a goal creation process according to approved relationships among goals and between goals and entities such as teams and individuals. One embodiment of the present invention relates to a method of aligning a new goal of an entity. That method ensures that the new goal is a child goal of a parent goal. The method also ensures that a group is linked to the parent goal, and the method ensures that the entity is subordinate to the group. For instance, selection lists may be used to constrain the available values for the group and/or the parent goal.

Another embodiment involves a method of facilitating contextual alignment of a new goal. That method recognizes an organizational role for an entity and customizes content of a user interface, based on the organizational role of the entity. The user interface with the customized content provides goal creation guidance according to the organizational role. For example, the customized content may include specialized instructions and sample content for characteristics of the new goal, such as a goal-objective characteristic, a goal-measure characteristic, and a goal-activity characteristic.

The embodiments summarized above thus facilitate the creation of goals with proper alignment, according to rules in an organization defining approved relationships between things such as goals, teams, and individuals. Additional embodiments provide additional technological solutions for guiding the goal creation process.

BRIEF DESCRIPTION OF THE DRAWINGS

A more complete understanding of the invention and its objectives and advantages may be acquired by referring to the following description and the accompanying drawings, wherein:

FIG. 5 presents a flow chart depicting a process for creating goals according to the example goal management system;

FIG. 9 depicts an example user interface for retrieving an existing goal to be copied into a new goal;

FIG. 11 depicts an example user interface which indicates that the new goal has been saved;

FIGS. 14 and 15 depict alternative user interfaces for initiating a goal creation process.

DETAILED DESCRIPTION

Overview

Figure 1:
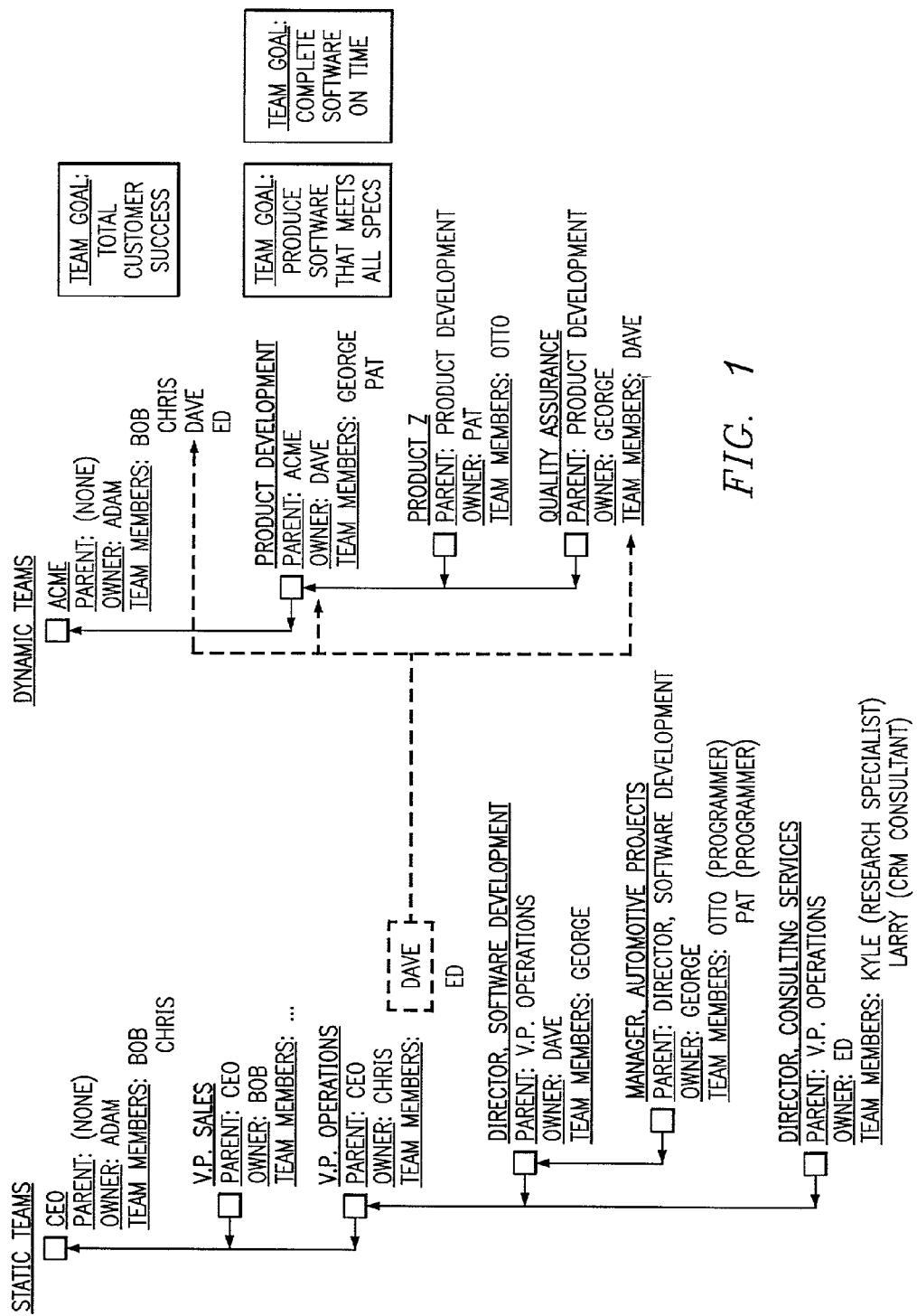
FIG. 1 presents a table with two columns respectively depicting a static chain of teams and a dynamic chain of teams, with arrows highlighting some differences between the static and dynamic chains.

The difficulties associated with supporting flexible strategies for team and goal management include challenges relating to ensuring that goals are organized in a logical and useful way. For example, in an organization with hierarchical teams, it is generally preferable for the goals of the lower-level teams to be aligned with the goals of the higher-level teams. That is, lower-level or secondary goals should generally align with higher-level or primary goals. However, when an organization allows teams to be organized according to two or more different hierarchies, it is difficult to provide flexibility with regard to relationships between goals, teams, and individuals, while ensuring that new goals align properly with existing goals and teams.

In general, a secondary goal is considered to be "aligned" or "in alignment" with a primary goal if the secondary goal assists in the realization of the primary goal. For example, with reference to FIG. 3, the secondary goal of implementing all required features in software Product Z is aligned with the primary goal of producing software that meets all specs.

Additional advantages are associated with goal management strategies which use two or more different types of goals to differentiate between goals for an entire team (i.e. team goals) and goals for individual team members, such as team-related goals. However, such strategies further increase the difficulty associated with ensuring that new goals are properly aligned. For all of the above reasons, organizations with flexible team and goal management strategies generally face greater risks of goal misalignment.

Therefore, a need has arisen for methods and systems for guiding the goal creation process to ensure that goals are properly aligned. For example, a need exists for methods and systems which ensure that team goals are linked to appropriate teams. A further need exists for methods and systems which guide goal creation by customizing content for one or more goal-creation user interfaces, based on the organizational role or job title of the individual creating the new goal.

As summarized above and described in greater detail below, an embodiment of the present invention guides an individual creating a new goal to ensure alignment of the new goal. The embodiment accomplishes that objective by ensuring that proper relationships exist between the new goal and a parent goal, and between the parent goal and a team. For example, the embodiment ensures that a team goal is created only by the individual who owns the associated team.

Another embodiment customizes content for one or more goal-creation user interfaces, based on the organizational role or job title of the individual creating the new goal. For example, if the individual is a manager of product development, the customized content may include instructions relating to, and sample content derived from, a predetermined typical goal for managers of product development.

An example embodiment implements technologies for guiding the goal creation process as components of a goal management system or application. The goal management application may operate on a computer or network of computers.

EXAMPLE EMBODIMENTS

Figure 4:
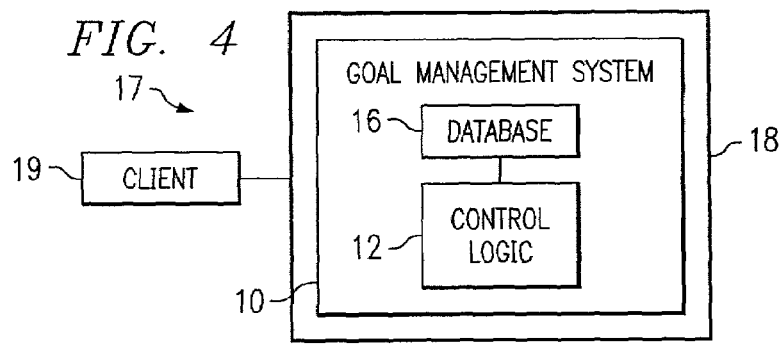
FIG. 4 is a block diagram of the physical and logical components of an example goal management system.

Referring now to FIG. 4, goal management system 10 is an example of a system that provides the technological ability to guide the creation of goals from the personal level to the highest company strategic initiative. Goal management system 10 has application to a wide range of industries and other organizations where goals and alignment of goals can be important. Example beneficiary industries include computer hardware and software, professional services, financial services, automotive, telecommunications, medical and pharmaceutical, and construction.

Goal management system 10 uses two basic team types: static teams and dynamic teams. The static teams depict the reporting chain of an organization and correspond, for example, to the management structure recorded in the organization's human resources (HR) database. Specifically, FIG. 1 includes a left column that lists Acme's static teams and a right column that lists Acme's dynamic teams, where Acme is an example organization. The static teams correspond to the Acme reporting chain.

Goal management system 10 implements team management rules, such as the rules described in the 0109 Application, to ensure that the stored static teams are organized according to the reporting chain. For instance, in the example embodiment, the rules require every static team to have one owner and zero or more team members. For each static team, the team members are the "direct reports" of the owner. The term "membership links" denotes the data constructs and associated content which are used to record the relationships between teams and individuals such as team owners and team members.

At the top of the chain shown in FIG. 1 is a team named "CEO." Team "CEO" includes an owner, Adam, who is the chief executive officer of Acme, and two team members, Bob and Chris, who report directly to Adam according to the organization's reporting chain and/or HR system. Since Team "CEO" is at the top of the chain, it has no parent team.

Team "CEO" is the parent team of teams "V.P. Sales" and "V.P. Operations." Also, Bob, who is the V.P. of Sales for Acme, and Chris, who is the V.P. of Operations, are the owners of Teams "V.P. Sales" and "V.P. Operations," respectively. Among the members of Team "V.P. Operations" is Dave, who is the Director of Software Development, as indicated in Team "Director, Software Development." Similarly, Team "Manager, Automotive Projects" and Team "Consulting Services" identify supervisors and respective direct reports.

In contrast to the static teams, the dynamic teams are not restricted to the structure of the reporting chain. For example, as indicated by the dashed arrows in FIG. 1, Dave is the owner of Team "Product Development" and George is a member, but George is the owner of Team "Quality Assurance" and Dave is a member.

In any particular implementation, parent teams may be directly or indirectly associated with subordinate or child teams. In the example embodiment, data records are used to store the team definitions, and those data records include parent-team fields that store identifiers for the parent teams. In alternative embodiments, the parent teams are identified indirectly. For example, parent teams may be identified by cross referencing the team owner with the lists of team members from other teams. In any case, the data constructs and associated content which are used to record the relationships between teams and parent teams are known as parent links. In the example embodiment, each of the static teams except for the top team is connected to the reporting chain via a respective parent link.

The example embodiment also imposes rules regarding the relationships between dynamic teams and regarding membership in dynamic teams to help ensure that teams and goals are aligned. For example, among the restrictions imposed by the data control logic 12 (FIG. 4) in goal management system 10 are the following:

1. every dynamic team has one owner and zero or more team members, and
2. the team members of a dynamic team are the individuals expected to work with the owner toward achieving one or more goals associated with the dynamic team.

It will be recognized by those of ordinary skill in the art that other restrictions or rules could be used to govern relationships in alternative embodiments. Also, with regard to both static and dynamic teams, it should be noted that the terms "owner" and "team member" describe two different types of membership. It should also be understood that the term "total membership" includes both owners and team members. Thus, a team with one owner and one team member has a total membership of two.

FIG. 1 indicates that Team "Product Development" has two team goals: "Produce software that meets all specs" and "Complete software on time." The members of Team "Product Development" would be expected to help with at least one of those team goals. In the example embodiment, goal management system 10 uses specific rules to control how goals are connected with teams and otherwise managed and what types of goals are supported. Those rules will now be described with reference to FIGS. 2 and 3.

Goal management system 10 supports two types of goals: team goals and team-related goals. Team goals are goals that the owner (e.g., the team leader) creates for the team. Team-related goals are goals that members of the team set for themselves in support of a team goal. In the example embodiment, team-related goals may also be referred to as personal goals. An alternative embodiment also supports personal goals that individuals may create for themselves without linking the personal goals to any particular team goals. As illustrated by the arrows in FIG. 2 relating each goal to a team and/or a person, each team goal is linked to a team, and each team-related goal is linked both to a team and a person. Further, personal goals according to the alternative embodiment are only linked to a person.

More specifically, in the example embodiment, goal management system 10 imposes the following rules regarding goals:

1. every goal is either a team goal or a team-related goal;
2. every goal has an owner;
3. each team goal is linked to one team and is created and managed by the owner of that team;
4. each team goal except for team goals of the top team (i.e. each child team goal) has a parent goal, and that parent goal is linked to the parent team of the team that is linked to the child team goal;
5. each child team goal has an owner, and that owner is one of the team members of the parent team of the team that is linked to that child team goal;
6. each team-related goal is linked to one team goal; and
7. each team-related goal is owned by one of the team members of the team associated with the team goal to which the team-related goal is linked.

In addition, the owner of a goal is preferably the person who creates and manages that goal.

Figure 3:
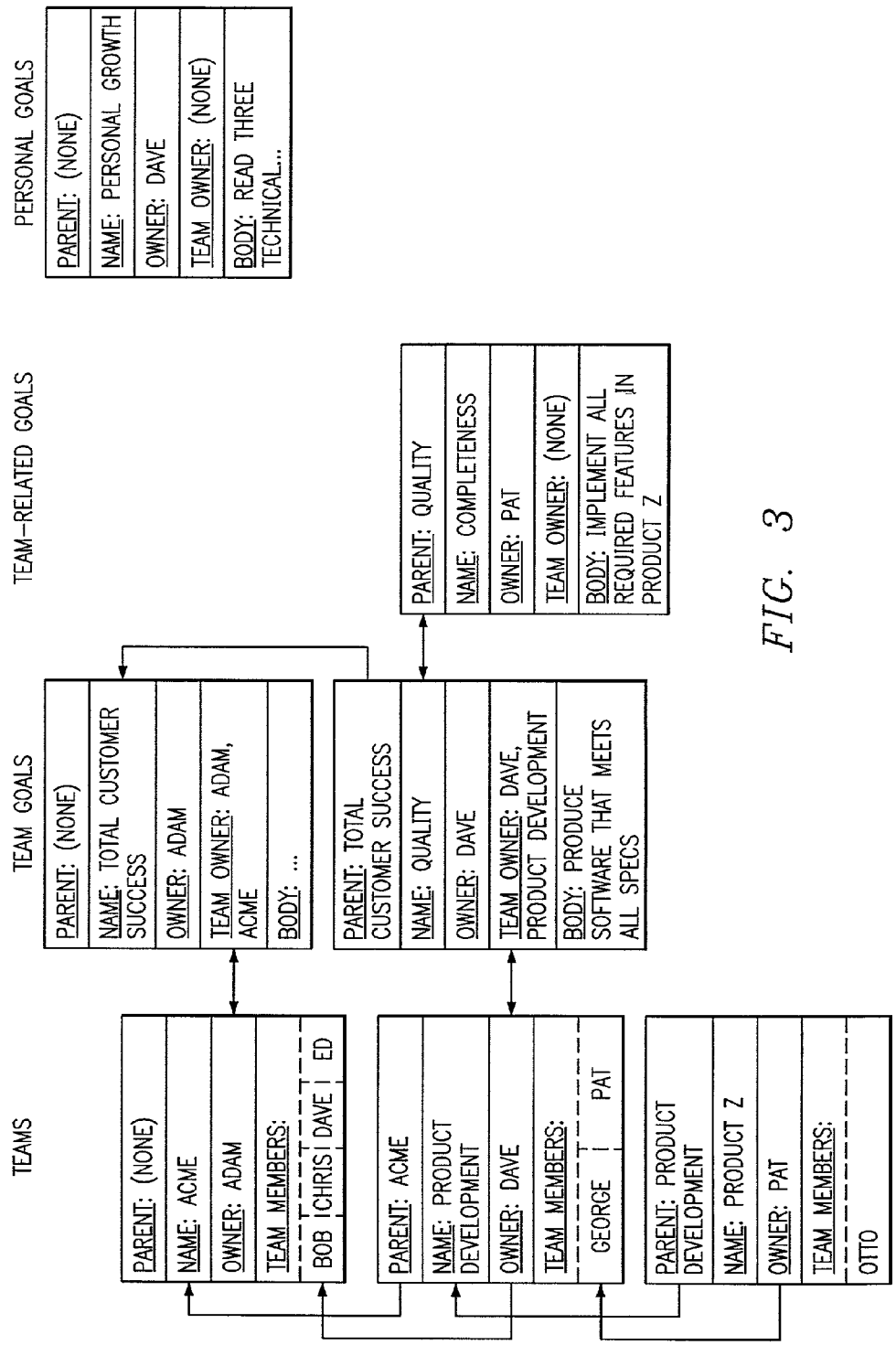
FIG. 3 is a block diagram depicting relationships between individuals, teams, and various types of goals.

FIG. 3 illustrates how team goals are related to teams and other goals. For example, FIG. 3 depicts a team goal named "Quality" in the TEAM GOALS column. In accordance with rule 3, "Quality" is linked to one team, Team "Product Development," via the Team Owner field. In accordance with rule 4, "Quality" has a parent goal of "Total Customer Success," and "Total Customer Success" is linked to the parent of Team "Product Development," "Team "Acme." Also, as per rule 5, the owner of "Quality" is one of the team members of the parent team of Team "Product Development." That is, Dave is one of the team members of Team "Acme".

In addition, FIG. 3 illustrates how team-related goals are related to teams and other goals. For example, FIG. 3 depicts a team-related goal "Completeness" in the TEAM-RELATED GOALS column. In accordance with rule 6, "Completeness" is linked to one team goal (i.e. "Quality). Also, in accordance with rule 7, the owner of "Completeness" (i.e. Pat) is one of the team members of the team associated with team goal "Quality." That is, Pat is one of the team members of Team "Product Development." The data constructs and associated content which are used to record the relationships between goals and teams are known generally as team links.

FIG. 3 also shows that personal goals according to the alternative embodiment are not linked to any other goals.

Referring again to FIG. 4, there is depicted a block diagram of goal management system 10 according to the example embodiment. The example embodiment implements goal management technologies or tools as control logic and data constructs that encode business rules which facilitate, and enforce use of, particular goal-management practices.

Specifically, goal management system 10 features control logic 12 which includes computer instructions for enforcing the rules described herein and presenting information to users, as described in greater detail below. For instance, those computer instructions may be programs written in the JAVA language and/or scripts written using Java Server Pages (JSP). Goal management system 10 also includes a database 16 for storing team and goal data on appropriate data storage. That data may be stored, for instance, in a relational database, such as a structured query language (SQL) database.

In the illustrated embodiment, database 16 and control logic 12 reside within a single data processing system 18. For example, goal management system 10 may operate within a client-server network 17, and data processing system 18 may be a server within network 17. Data processing system 18 may include one or more central processing units (CPUs) and data storage, such as read only memory (ROM), random access memory (RAM), one or more hard disk drives, CD drives, etc. The data storage devices and media may also be referred to as computer-usable media. Additional computer-usable media include, without limitation, transmission media such as wires, radio waves, microwaves, and other electromagnetic and/or optical carriers. Visual output may be presented primarily on displays of client data processing systems 19 within network 17, based on information communicated by control logic 12. The different components for data storage, instruction processing, output presentation, etc., are known generally as processing resources.

However, numerous changes to the illustrated arrangement could easily by utilized in alternative embodiments of the invention. For example, multiple databases could be used, and one or more of those databases could reside on one or more machines separate from the machine hosting the control logic. Similarly, components or modules of the control logic could run on different hardware, such as within network clients. Likewise, different types of networks, different types of hardware, and different programming languages could be used to implement alternative embodiments of the goal management system of the present invention. Alternatively, all operations, including the display of information, could be performed in a single data processing system. For purposes of illustration, however, this detailed description focuses on the embodiment shown in FIG. 4.

In the example embodiment, goal management system 10 generally sends output to users and receives input from users and via client data processing systems such as client 19. Consequently, unless otherwise explicitly specified, when an interaction between goal management system 10 and an individual user is described herein, it should be understood that client 19 may serve as an intermediary, presenting information from goal management system to the user and receiving input for goal management system 10 from the user.

Referring now to FIG. 5, there is depicted a flowchart of an example process for guiding goal creation according to an embodiment of the invention. The illustrated process begins at block 20 with goal management system 10 running on data processing system 18. Specifically, referring also to FIG. 6, the process starts with goal management system 10 communicating the client 19 to cause client 19 to display a graphical user interface (GUI) screen 100 that includes graphical objects, such as a create tab 102 and a Create a New Goal button 104, for initiating the creation of a goal. Preferably, in a preceding step, an individual at claim 19 has authenticated himself for goal management system 10, for example by logging in with a user identifier and password.

Figure 6:
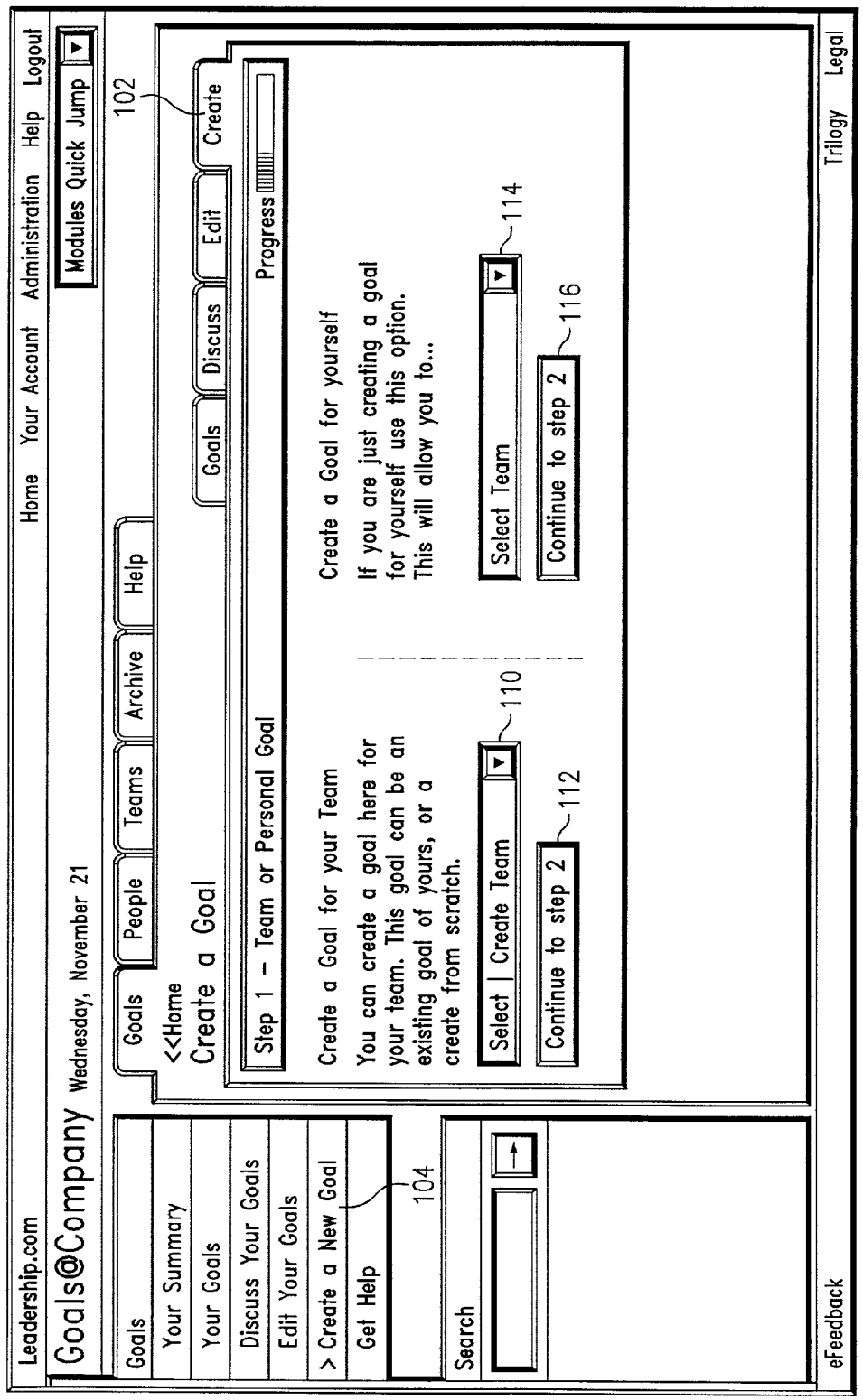
FIGS. 6–8 depict example user interfaces for initiating a goal creation process.

As shown at block 22, the process continues with goal management system 10 detecting that the individual has selected a goal creation object. In response, as indicated at block 24, goal management system 10 modifies screen 100 to prompt the individual for a goal type and for preliminary alignment information. Specifically, as depicted in FIG. 6, goal management system 10 presents a drop-down box or list box 110 and an associated continue button 112 for new team goals, as well as a list box 114 and an associated continue button 116 for new team-related goals. If the individual selects a team from list box 110 and selects continue button 112, goal management system 10 classifies the new goal as a team goal to be linked to the selected team, for example via the Team Owner field. If the individual selects a team from list box 114 and selects continue button 116, goal management system 10 classifies the new goal as a team-related goal for the individual.

Figure 2:
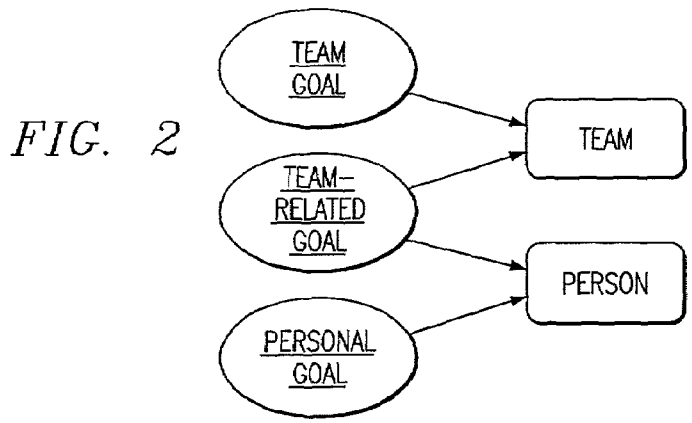
FIG. 2 is a block diagram depicting relationships between goals, teams, and individuals.

In the alternative embodiment referenced above in relation to FIG. 2, list box 114 includes an entry for "no team." If the individual selects that entry and selects continue button 116, goal management system 10 classifies the new goal as a personal goal for the individual.

Furthermore, in the example embodiment, goal management system 10 determines which teams are owned by the individual, and populates the list for list box 110 with those teams only. Likewise, goal management system 10 populates the list for list box 114 only with teams having the individual as owner or team member. Goal management system 10 thus prevents individuals from creating team goals for teams the individuals do not own and from creating team-related goals that relate to teams which do not include the individuals.

Figure 7:
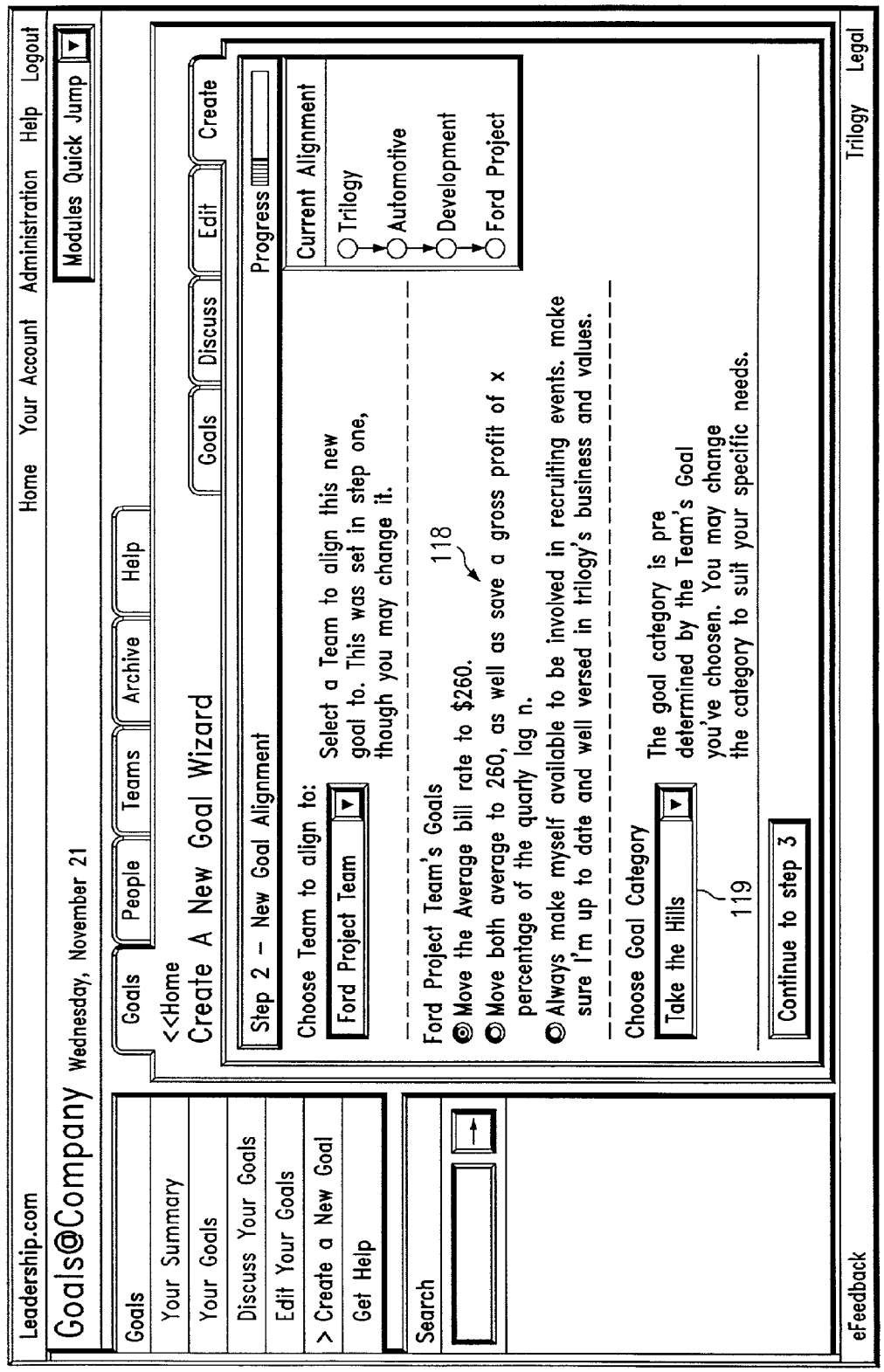

If the individual is creating a team related goal, the process passes through block 26 to block 28. At block 28, goal management system 10 further determines alignment by prompting the individual to select a parent goal and a category for the new goal, for example from a radio-button list 118 and a list box 119, as illustrated in FIG. 7. In the example embodiment, the candidate parent goals in the list are limited to existing team goals for the previously selected team, and the categories are goals set for the entire organization by an upper-level individual such as the CEO. By only listing teams that include the individual and then only listing goals that are linked to the previously selected team, goal management system ensures that the parent goal will be linked to a team that includes the individual.

Then, as indicated at block 30, goal management system 10 prompts for a starting point for the new goal. For example, with reference to FIG. 8, goal management system 10 presents options for starting with an existing goal or creating a new goal from scratch.

If the individual selects the option to start from an existing goal, the process passes through block 32 to block 34, which depicts goal management system 10 obtaining search parameters from the individual. Specifically, with reference to FIG. 9, goal management system 10 presents various graphical input objects 120 such as text boxes and list boxes for accepting search criteria. Input objects 120 provide for search parameters including name, department or business unit, supervisor, job title, and vertical section. In the example embodiment, goal management system provides default values for the search parameters, based on a user profile for the individual that includes the individuals name, job title, department, manager, and vertical section. The user profile may be retrieved based on the individual's user identifier. When the individual activates the search function, goal management system 10 presents a list 122 of existing goals which match the specified criteria, as indicated at block 36.

Figure 10:
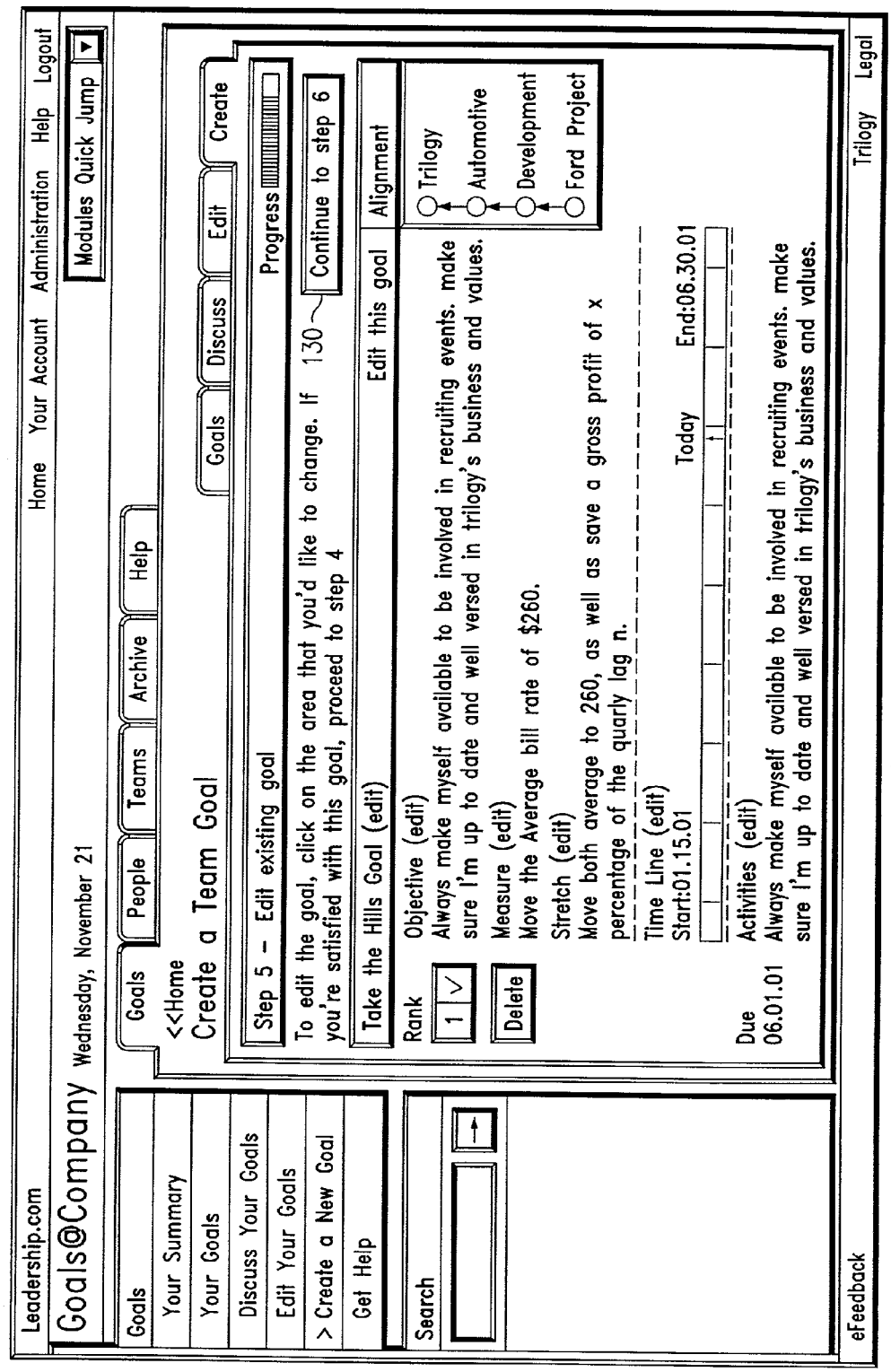
FIG. 10 depicts an example user interface for modifying the new goal.
Figure 11:
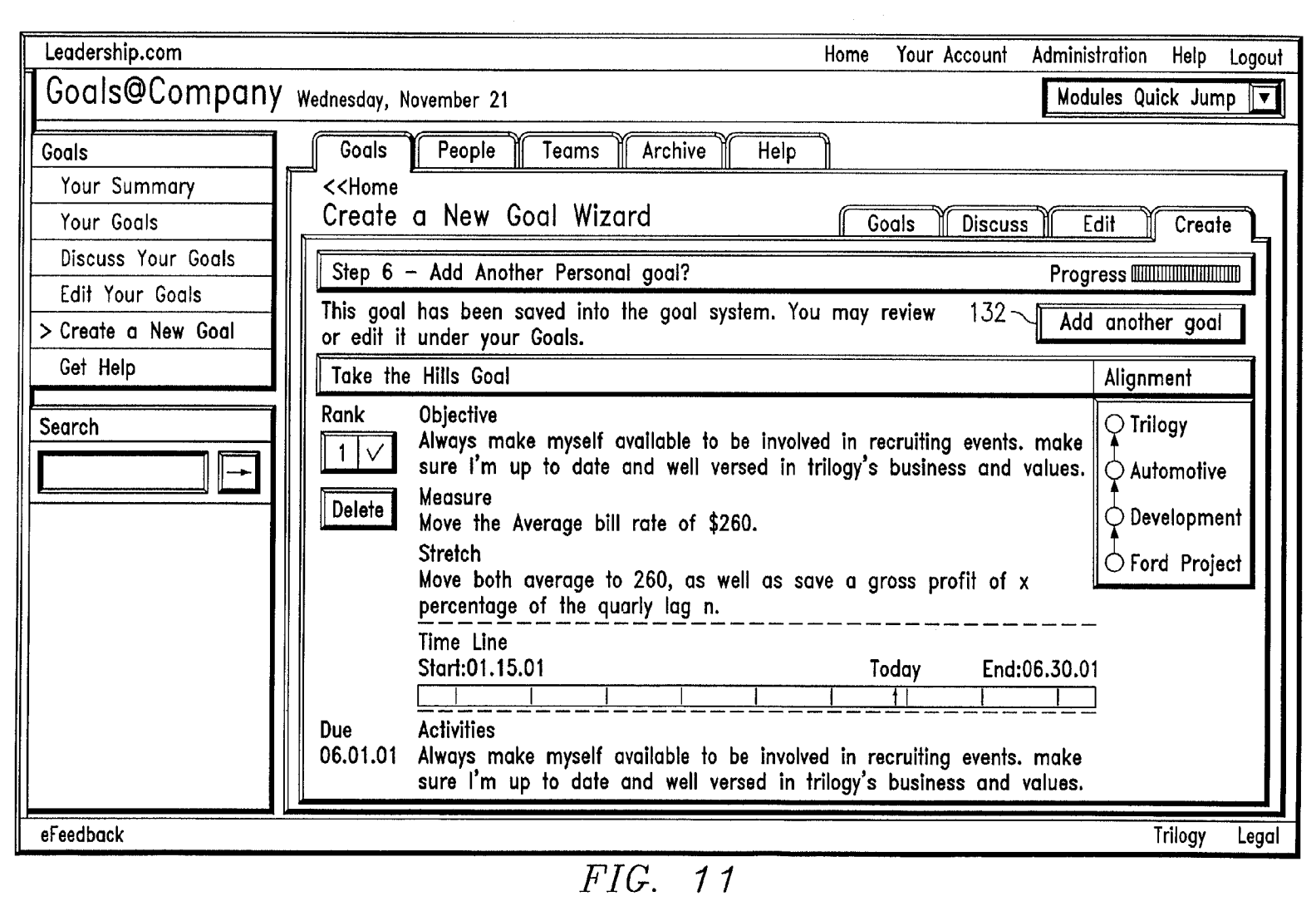

When the individual selects one of those goals and presses a continue button 124, goal management system 10 copies content from the selected goal into the new goal and presents the new goal for modification, as illustrated in FIG. 10. Goal management system 10 then allows the individual to modify the content, as depicted at block 38, for example using screens like those described below with reference to adding a goal from scratch. Once the individual has edited the content as desired, selecting continue button 130 causes goal management system 10 to save the new goal in database 16, as indicate at block 40. The process then returns to block 22 to allow the individual to begin creating another goal by selecting an add button 132, as shown in FIG. 11.

Figure 12:
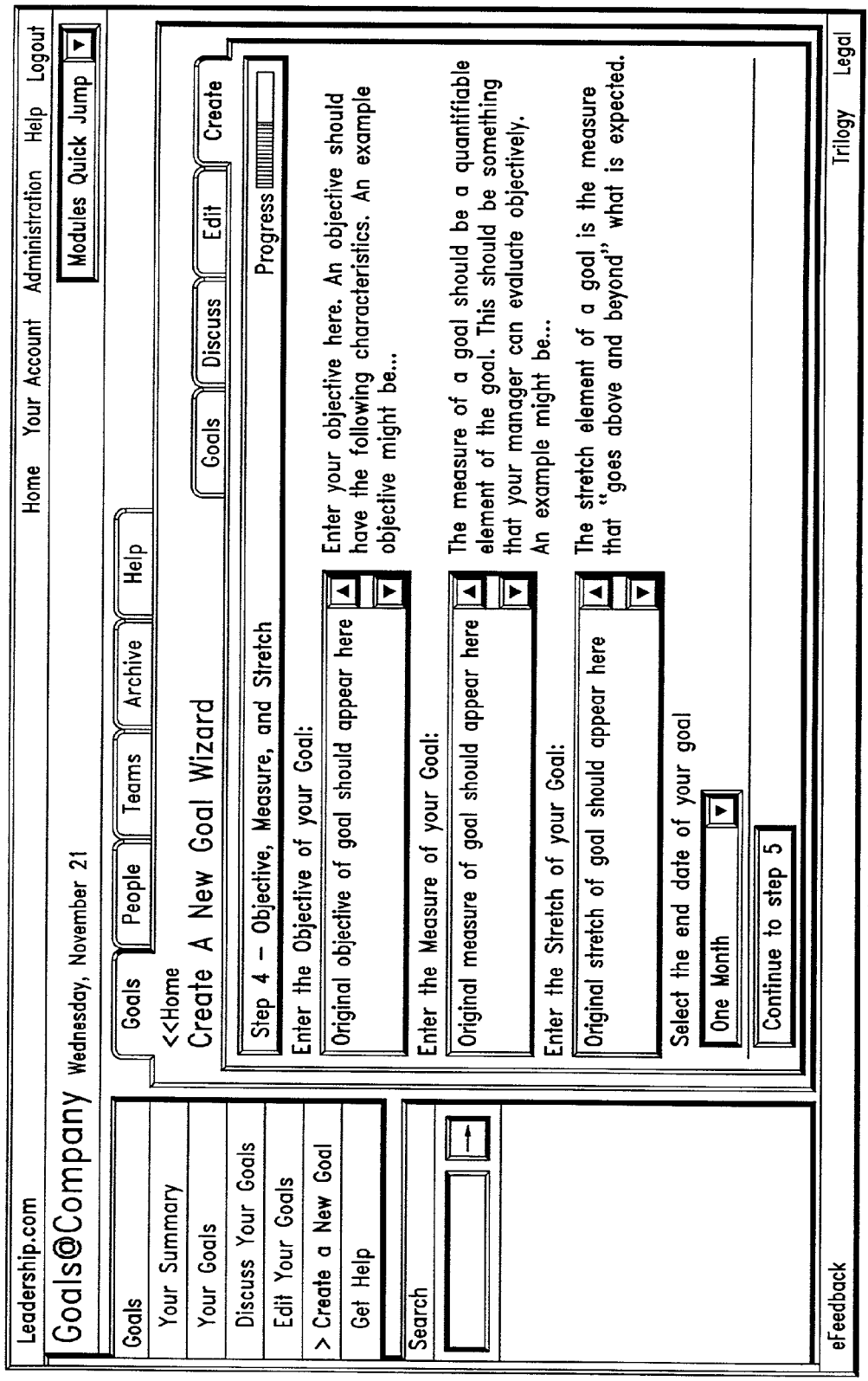
FIGS. 12 and 13 depict example user interfaces which accept content for the new goal.

Referring again to block 30, if the individual elects to create the goal from scratch, the process passes through block 32 to block 70, and goal management system 10 uses attributes such as job title or job type, department or business unit, and manager or supervisor from the user profile to retrieve a goal template. As depicted at block 70 and in FIGS. 12–13, goal management system 10 then prompts the individual to enter content for the new goal in screens 140 and 142. Specifically, goal management system 10 prompts for an objective, a measure, a stretch, a predicted completion time, and specific activities for the goal.

Furthermore, goal management system 10 customizes the content of screens 140 and 142 according to the template to provide specialized content and instructions for those fields. The specialized content and instructions provide guidance that is personalized specifically for individuals in the position of the individual adding the new goal. For example, goal management system 10 may retrieve one template for an individual with a job title of Project Leader, a department of Software Development, and a vertical section of Automotive. By contrast, goal management system 10 may retrieve a different template for an individual with a job title of Director, a department of Sales, and a vertical section of Telecommunications. The first template would include content and instruction appropriate for the first individual, whereas the second template would be appropriate for the second individual. In addition, managers may customize templates. Thus, the templates facilitate contextual alignment between an individual and the individual's goals, for example, contextual alignment between the individual and the individual's position with an organization.

Figure 13:
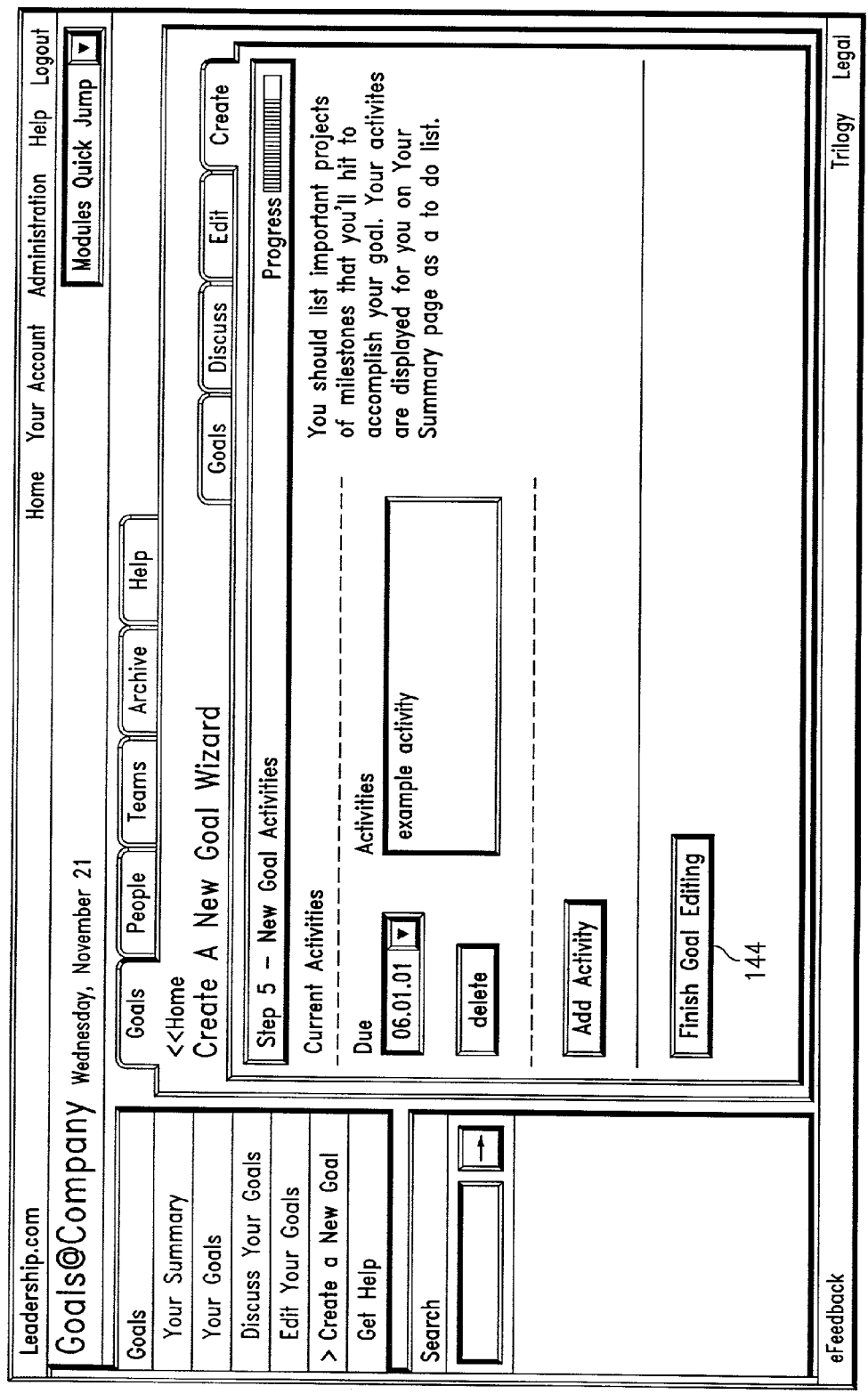

Once the individual has edited the sample content as desired, selecting Finish Goal Editing button 144 in FIG. 13 causes goal management system 10 to save the new goal in database 16, as indicated at block 72. The process then returns to block 22, to allow the individual to begin creating another goal.

Referring again to blocks 24 and 26, if the individual is creating a team goal, the process passes to block 50. As illustrated in FIG. 14, goal management system 10 then presents an option for converting team-related goals into team goals and an option for creating a new team goal. Specifically, goal management system 10 determines which of the individual's team-related goals are linked via team goals to the team selected at block 24, and goal management system 10 presents those goals for selection, for example in a radio-button list 148.

If the individual selects one of those goal and presses a continue button 150, the process passes through block 51 to block 59, which shows goal management system 10 converting the selected team-related goal into a team goal. In the example embodiment, the selected goal will have a parent goal, and that parent goal will be a team goal. Goal management system 10 converts the selected goal to a team goal by copying the information from the Team Owner and Parent fields of that parent goal to the corresponding fields of the selected goal. As depicted at blocks 60 and 62, the individual may then edit and save the new team goal using screens such as those illustrated in FIGS. 10, 12, and 13.

Moreover, in accordance with rule 5 in the rules for goals set forth above, goal management system 10 ensures that the owner of each child team goal is one of the team members of the parent team of the team that is linked to that child team goal. Copying the Team Owner and Parent fields from the parent goal to the new team goal therefore ensures that the parent goal of the new team goal is linked to a team that includes the individual.

Figure 15:
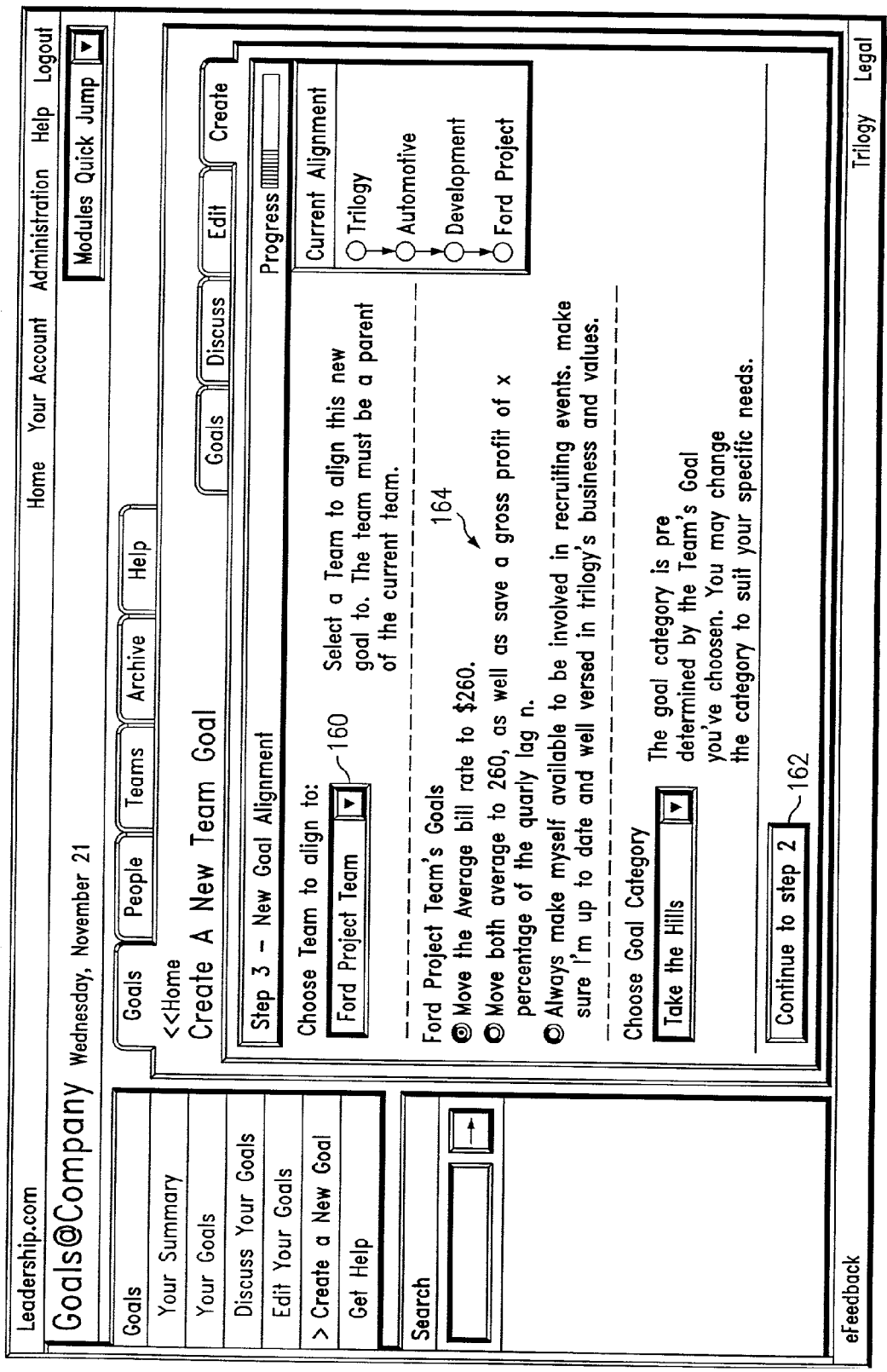

However, referring again to block 50 and FIG. 14, if the individual selects continue button 152, the process passes through block 51 to block 52, which shows goal management system 10 prompting the individual for goal alignment. Specifically, as illustrated in FIG. 15, goal management system 10 determines which team is the parent of the team that was selected at block 24, and goal management system 10 displays the name of that parent team in an object such as list box 160. Goal management system 10 also determines the team goals for that parent team and lists those team goals for selection, for example in radio-button list 164. The individual may modify the selection for parent goal, as well as a selection for category, if desired, and then select a continue button 162.

Figure 8:
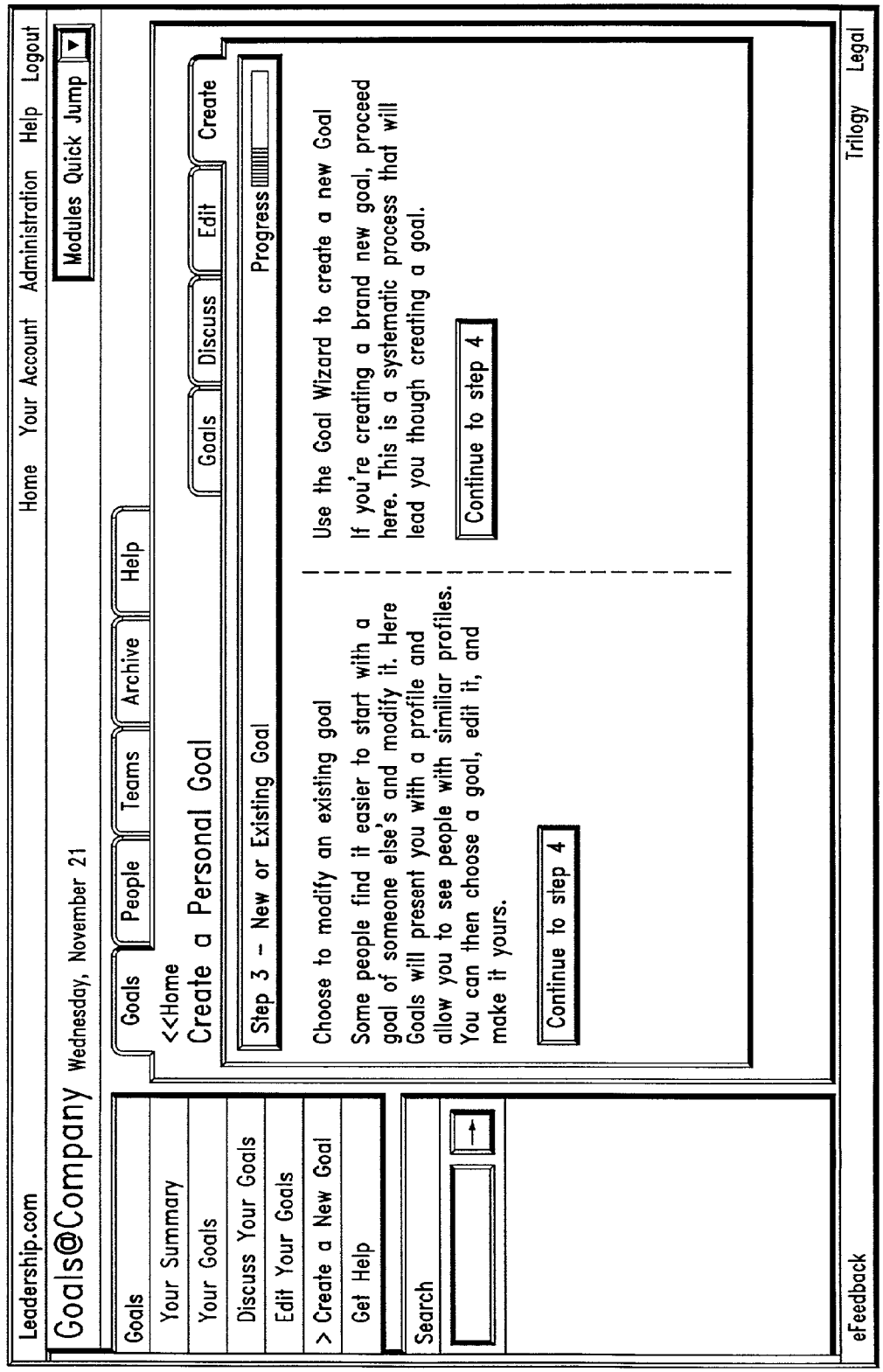

Goal management system 10 then prompts for a starting point for the new goal, allowing the individual to either copy from an existing goal or start from scratch, as depicted at block 53, using an interface such as the one illustrated in FIG. 8. If the individual elects to start from scratch, the process passes through blocks 70 and 72, with goal management system 10 accepting input and using a customized template for the new team goal and saving the new team goal, substantially as described above with regard to team-related goals.

However, if the individual elects to copy from an existing goal, the process passes through blocks 54, 56, 58, 60, and 62, with goal management system 10 retrieving candidate goals based on search criteria, accepting edits, and saving the new team goal substantially as described above with regard team-related and personal goals with reference to blocks 34, 36, 38, and 40.

As described above, goal management system 10 requires the individual to select a team that is owned by the individual at the beginning of the team goal creation process. Also, goal management system 10 requires the individual to link the new goal to a team goal for the parent team of the selected team. Further, the owner of each team except the top team must be a team member of the corresponding parent team. Consequently, the process described above ensures that the parent goal of the new team goal is linked to a team that includes the individual.

After the new team goal has been saved, the process returns to block 22, with goal management system 10 allowing the user to create another goal. In the alternative embodiment, a process similar to the one provided for team related goals may be used to create personal goals. According to the alternative embodiment, however, the individual is not prompted to link the personal goal to a team or to another goal.

Figure 16:
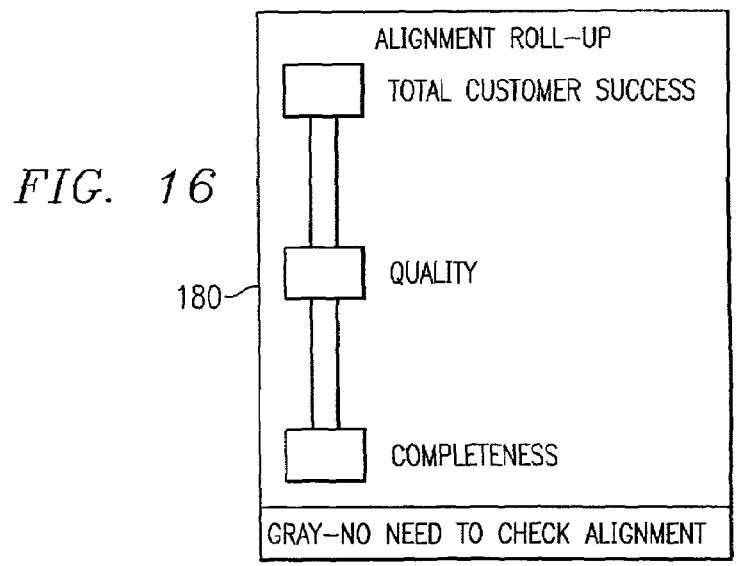
FIG. 16 depicts an example user interface that provides alignment information for a chain of goals.

Goal management system 10 also provides an interface that indicates at a glance the relative positions of particular goals and whether any particular goal should be checked for alignment. For example, with reference to FIG. 16, goal management system 10 provides an alignment roll-up window 180 that shows the chain of goals from a given goal to the top goal. Alignment roll-up window 180 also indicates whether alignment should be checked between any goal and its parent goal. For example, if alignment between a goal and its parent should be checked, goal management system 10 shows the link between the goal and its parent in amber or red, rather than a default color such as gray.

CONCLUSION

As has been described, the example goal management system provides a variety of features which facilitate the creation of aligned goals in an organization with relatively flexible policies for team and goal management. The goal management system enforces rules which require certain relationships between the organization's goals and its teams, thereby helping individuals avoid creating inconsistent or duplicative goals and helping to ensure that all of the goals contribute to the overall purpose or goals of the organization.

Although an example embodiment of the present invention has been described in detail, it should be understood that various changes, substitutions and alterations can be made to the example embodiment without departing from the spirit and scope of the invention. For example, although FIG. 1 might be interpreted as suggesting that data constructs such as identifiers or pointers within records or rows are utilized to encode and store relationships such as parent links in the goal management system, those of ordinary skill in the art will appreciate that the actual mechanisms utilized to encode such relationships may easily be varied to suit the operating environment for a particular goal management system. The implementation specifics for any particular embodiment should be chosen based on well-known considerations such as the operating environment (including hardware and software), cost, and performance objectives. In general, embodiments of the invention may be implemented in hardware, software, or a combination of hardware and software.

The scope of the invention is therefore not limited to the particulars of the illustrated embodiments but is defined by the appended claims.

What is claimed is:

1. A computer-implemented method of guiding an individual creating a new goal to facilitate alignment of the new goal, the method comprising:
   receiving user input from the individual relating to creation of the new goal in a goal management system;
   ensuring that the new goal is a child goal of a parent goal in the goal management system;
   ensuring that the parent goal is linked to a team that includes the individual, wherein ensuring that the parent goal is linked to a team that includes the individual comprises;
      identifying multiple teams that include the individual; and
      prompting the individual to select one of the multiple teams; and
   storing the new goal, such that the goal management system accumulates a collection of goals and goal relationships for future reference.

2. The method of claim 1, wherein prompting the individual to select one of the multiple teams comprises automatically identifying a default team.

3. The method of claim 1, further comprising:
   identifying one or more candidate parent goals that are linked to the team that includes the individual; and
   prompting the individual to select a goal among the one or more candidate parent goals to be the parent goal to the new goal.

4. The method of claim 3, wherein prompting the individual to select a goal comprises automatically identifying a default parent goal.

5. The method of claim 1, further comprising:
   prompting the individual to specify a team to be linked directly to the new goal;
   ensuring that the specified team is owned by the individual; and
   saving the new goal as a team goal for the specified team.

6. The method of claim 5, wherein prompting the individual to specify a team and ensuring that the specified team is owned by the individual comprises:
   identifying two or more teams owned by the individual; and
   prompting the individual to select the team to be linked directly to the new goal from the two or more identified teams.

7. The method of claim 1, further comprising:
   recognizing an organizational role for the individual; and
   customizing content of a user interface, based on the organizational role of the individual, such that the user interface with the customized content provides goal creation guidance according to the organizational role.

8. The method of claim 7, wherein customizing content of a user interface comprises providing specialized instructions and sample content for characteristics of the new goal.

9. The method of claim 7, wherein customizing content of a user interface comprises:
   retrieving a specialized template, based on a department and a job title for the individual; and
   providing specialized instructions and sample content for characteristics of the new goal, based on the specialized template.

10. The method of claim 9, wherein providing specialized instructions and sample content for characteristics of the new goal comprises providing customized content for a goal-objective characteristic, a goal-measure characteristic, and a goal-activity characteristic for the new goal.

11. The method of claim 1, further comprising prompting the individual to select a category for the new goal from a list of high-level goals.

12. A computer-implemented method of guiding goal creation according to approved relationships between goals, teams, and individuals, the method comprising:
   authenticating an individual, based on a user identifier;
   retrieving an organizational profile for the individual, based on the user identifier, wherein the organizational profile includes a department for the individual in an organization and a job title for the individual in the organization;
   receiving a request from the individual to begin creating a new goal;
   identifying a first team as a default team to be associated with the new goal;
   receiving input from the individual identifying a second team to be associated with the new goal in lieu of the first team;
   prompting the individual to select between creating the new goal from scratch and copying the new goal from an existing goal;
   in response to the individual selecting to copy the new goal from an existing goal, presenting a search interface that includes default values for search parameters, wherein the default values are based on the department, the job title, and a manager for the individual;
   in response to the individual requesting a goal search from the search interface, returning a list of goals that match the search parameters of the search interface;
   in response to the individual selecting a goal from the list of goals, copying content from the selected goal into the new goal and providing at least one interface for the individual to modify the content for the new goal;
   in response to the individual selecting to create the new goal from scratch, retrieving a specialized template based on the department and the job title for the individual, wherein the specialized template includes specialized instructions and sample content for characteristics of the new goal, wherein the characteristics with specialized instruction and sample content include a goal-objective characteristic, a goal-measure characteristic, and a goal-activity characteristic for the new goal;

ensuring that the new goal is a child goal of a parent goal in the goal management system wherein ensuring that the parent goal is linked to a team that includes the individual comprises;

identifying multiple teams that include the individual; and receiving a selection of one of the multiple teams; and sending the specialized instructions and sample content to the individual.

13. Software for creating goals that comply with approved relationships between goals, teams, and individuals, the software comprising:

means for ensuring that a new goal is a child goal of a parent goal; and means for identifying multiple teams that include the individual;

means for receiving a selection of one of the multiple teams; and means for ensuring that the parent goal is linked to the team for which a selection has been received and which includes the individual.

14. A program product for guiding an individual creating a new goal, the program product comprising:

computer instructions that:

ensure that the new goal is a child goal of a parent goal;

identify multiple teams that include the individual;

receiving a selection of one of the multiple teams;

ensure that the parent goal is linked to a team that includes the individual; and a computer-usable medium encoding the computer instructions.

15. The program product of claim 14, wherein the computer instructions, which prompt the individual to select one of the multiple teams, further comprise computer instructions that automatically identify a default team.

16. The program product of claim 14, wherein the computer-usable medium further encodes computer instructions that:

identify one or more candidate parent goals that are linked to the team that includes the individual; and prompt the individual to select a goal among the one or more candidate parent goals to be the parent goal to the new goal.

17. The program product of claim 16, wherein the computer instructions, which prompt the individual to select a goal, further comprise computer instructions that automatically identify a default parent goal.

18. The program product of claim 14, wherein the computer-usable medium further encodes computer instructions that:

prompt the individual to specify a team to be linked directly to the new goal;

ensure that the specified team is owned by the individual; and save the new goal as a team goal for the specified team.

19. The program product of claim 18, wherein the computer instructions which prompt the individual to specify a team and ensure that the specified team is owned by the individual comprise computer instructions that:

identify two or more teams owned by the individual; and prompt the individual to select the team to be linked directly to the new goal from the two or more identified teams.

20. The program product of claim 14, wherein the computer-usable medium further encodes computer instructions that:

recognize an organizational role for the individual; and customize content of a user interface, based on the organizational role of the individual, such that the user interface with the customized content provides goal creation guidance according to the organizational role.

21. The program product of claim 20, wherein the computer instructions, which customize content of a user interface, further comprise computer instructions that provide specialized instructions and sample content for characteristics of the new goal.

22. The program product of claim 20, wherein the computer instructions, which customize content of a user interface, further comprise computer instructions that:

retrieve a specialized template, based on a department and a job title for the individual; and provide specialized instructions and sample content for characteristics of the new goal, based on the specialized template.

23. The program product of claim 22, wherein the computer instructions which provide specialized instructions and sample content for characteristics of the new goal comprise computer instructions which provide customized content for a goal-objective characteristic, a goal-measure characteristic, and a goal-activity characteristic for the new goal.

24. The program product of claim 14, wherein the computer-usable medium further encodes computer instructions that prompt the individual to select a category for the new goal from a list of high-level goals.

25. The program product of claim 14, wherein the computer-usable medium comprises a member selected from the group consisting of (i) electronic signals modulated in accordance with the computer instructions, (ii) magnetic readable storage material, (iii) optically readable storage material, and (iv) optical signals modulated in accordance with the computer instructions.

26. A computer-implemented method of aligning, in a goal management system, a new goal of an entity, the method comprising:

receiving user input from an individual relating to creation of the new goal;

ensuring that the new goal is a child goal of a parent goal in the goal management system;

ensuring that a group is linked to the parent goal;

identifying multiple groups that include the entity;

receiving a selection of one of the multiple groups;

ensuring that the entity is subordinate to the group selected by the individual; and storing the new goal in the goal management system, such that the goal management system accumulates a collection of goals and goal relationships for future reference.

27. The method of claim 26, wherein:

the entity is an individual;

the group is a team; and the new goal is a team-related goal.

28. The method of claim 26, wherein:

the entity and the group are teams; and the new goal is a team goal.

29. A computer-implemented method of facilitating contextual alignment of a new goal, the method comprising:

receiving user input relating to creation of the new goal;

ensuring that the new goal is a child goal of a parent goal;

ensuring that a group is linked to the parent goal;

ensuring that the entity is subordinate to the group;

identifying multiple groups that include the entity;
receiving a selection of one of the multiple teams;
recognizing an organizational role for an entity; and
customizing content of a user interface, based on the organizational role of the entity, such that the user interface with the customized content provides goal creation guidance according to the organizational role.

30. The method of claim 29, wherein customizing content of a user interface comprises providing specialized instructions and sample content for characteristics of the new goal.

31. The method of claim 29, wherein customizing content of a user interface comprises:
retrieving a specialized template, based on a department for the entity; and
providing specialized instructions and sample content for characteristics of the new goal, based on the specialized template.

32. The method of claim 31, wherein providing specialized instructions and sample content for characteristics of the new goal comprises providing customized content for a goal-objective characteristic, a goal-measure characteristic, and a goal-activity characteristic for the new goal.

33. The method of claim 29, further comprising:
identifying one or more candidate parent goals that are linked to the group; and
prompting an individual to select a goal among the one or more candidate parent goals to be the parent goal to the new goal.

34. A system for guiding an individual creating a new goal, the system comprising:
processing resources that:
receive user input relating to creation of the new goal;
ensure that the new goal is a child goal of a parent goal;
receive user input that selects a team, wherein the team selected is one of multiple teams identified as including the individual;
ensure that the parent goal is linked to the team selected that includes the individual; and
cause the new goal to be stored, such that the system facilitates goal alignment.

35. An apparatus comprising:
computer program instructions that generate an electronically displayable user interface which guides an individual creating a new goal, the user interface comprising:
a first selection list which includes multiple teams that include the individual;
a second selection list which includes multiple goals associated with a selected team from the first selection list; and
a continue button which, when selected, initiates creation of a new goal with a team link to the selected team and a parent link to a selected goal from the second selection list.

36. An apparatus comprising:
computer program instructions that generate an electronically displayable user interface which guides an individual creating a new goal, the user interface comprising:
specialized instructions and sample content for characteristics of the new goal, wherein the specialized instructions and sample content provide goal creation guidance according to a role of the individual within an organization, such that the specialized instructions and sample content facilitate contextual alignment between the new goal and the role of the individual
instructions to prompt the individual to select one of the multiple teams that include the individual.

37. The apparatus of claim 36, wherein the specialized instructions and sample content are based on a department and a job title for the individual.

38. The apparatus of claim 36, wherein the specialized instructions and sample content comprise customized content for a goal-objective characteristic, a goal-measure characteristic, and a goal-activity characteristic for the new goal.

* * * * *